United States Patent
Hansen et al.

(10) Patent No.: US 12,201,063 B2
(45) Date of Patent: Jan. 21, 2025

(54) SUGARCANE HARVESTER EXTRACTOR WITH FIXED LEAF SHREDDER

(71) Applicant: DEERE & COMPANY, Moline, IL (US)

(72) Inventors: Matthew J. Hansen, Thibodaux, LA (US); Dusk S. Mixon, Saint Amant, LA (US); Todd J. Rodrigue, Thibodaux, LA (US); Jae-Jae Young, Thibodaux, LA (US); Juraj Kocis, Slovany (SK); Jesus Reinaldo Landinez, South Jordan, UT (US)

(73) Assignee: DEERE & COMPANY, Moline, IL (US)

( * ) Notice: Subject to any disclaimer, the term of this patent is extended or adjusted under 35 U.S.C. 154(b) by 727 days.

(21) Appl. No.: 17/451,400

(22) Filed: Oct. 19, 2021

(65) Prior Publication Data
US 2023/0121162 A1    Apr. 20, 2023

(51) Int. Cl.
    *A01D 45/10*    (2006.01)
    *A01D 43/08*    (2006.01)

(52) U.S. Cl.
    CPC .............. *A01D 45/10* (2013.01); *A01D 43/08* (2013.01)

(58) Field of Classification Search
    CPC ................... A01D 45/10; A01D 43/08; A01F 29/00–29/22; B02C 18/08–18/086; B02C 2201/066
    See application file for complete search history.

(56) References Cited

U.S. PATENT DOCUMENTS

| 3,830,046 | A | * | 8/1974 | Rollitt | A01D 45/10 56/16.5 |
| 3,925,199 | A | * | 12/1975 | Quick | A01D 45/10 209/139.1 |
| 4,155,602 | A | * | 5/1979 | Quick | A01D 45/10 209/139.1 |
| 4,287,708 | A | * | 9/1981 | Neely, Jr. | A01D 43/00 241/73 |
| 6,457,295 | B1 | | 10/2002 | Arnold | |
| 12,041,878 | B2 | * | 7/2024 | Hansen | A01D 45/10 |
| 2002/0073675 | A1 | * | 6/2002 | Buermann | A01F 29/025 56/255 |

(Continued)

FOREIGN PATENT DOCUMENTS

BR    202016008931 Y1    5/2021
EP        0099561 A2 *   2/1984

*Primary Examiner* — Adam J Behrens
*Assistant Examiner* — Madeline I Runco

(57) ABSTRACT

An extractor is disclosed for a sugarcane harvester that chops stalks of sugarcane into billets. The extractor comprises a housing, a fan positioned within the housing and comprising fan blades mounted for rotation in a rotational path about an axis of rotation to induce a flow of air to extract leaf material from billets produced by the sugarcane harvester, and a leaf shredder positioned within the housing and comprising shredding knives fixed against rotation about the axis of rotation, the shredding knives offset axially from the fan blades relative to the axis of rotation in proximity to the rotational path of the fan blades such that the fan blades and the shredding knives cooperate to shred leaf material by shearing action as the fan blades rotate past the shredding knives about the axis of rotation.

18 Claims, 10 Drawing Sheets

(56) References Cited

U.S. PATENT DOCUMENTS

| | | | | |
|---|---|---|---|---|
| 2015/0327438 A1* | 11/2015 | Cazenave | .............. | A01D 45/10 |
| | | | | 56/51 |
| 2017/0251601 A1* | 9/2017 | Dugas | ..................... | A01F 12/56 |
| 2019/0003731 A1* | 1/2019 | Gettig | ................... | F04D 29/601 |
| 2022/0346317 A1* | 11/2022 | Hansen | .................. | A01D 45/10 |

* cited by examiner

SUGARCANE HARVESTER EXTRACTOR WITH FIXED LEAF SHREDDER

FIELD OF THE DISCLOSURE

The present disclosure relates to extractors for sugarcane harvesters.

BACKGROUND OF THE DISCLOSURE

Sugarcane harvesters often have a chopper, an elevator, and one or more extractors. The chopper chops sugarcane stalks harvested by the sugarcane harvester into segments called "billets." The elevator lifts the billets to a higher elevation for discharge into a wagon for transport to a mill. A primary extractor is located between the chopper and the elevator. In sugarcane harvesters that have a secondary extractor, the secondary extractor is mounted to the upper discharge end of the elevator. Each extractor has a fan to induce a flow of air to extract leaf material of the harvested sugarcane plants from the billets so as to clean the billets.

SUMMARY OF THE DISCLOSURE

According to an aspect of the present disclosure, there is disclosed an extractor for a sugarcane harvester that chops stalks of sugarcane into billets. The extractor comprises a housing, a fan, and a leaf shredder. The fan is positioned within the housing and comprising fan blades mounted for rotation in a rotational path about an axis of rotation to induce a flow of air to extract leaf material from billets produced by the sugarcane harvester. The leaf shredder is positioned within the housing and comprising shredding knives fixed against rotation about the axis of rotation, the shredding knives offset axially from the fan blades relative to the axis of rotation in proximity to the rotational path of the fan blades such that the fan blades and the shredding knives cooperate to shred leaf material by shearing action as the fan blades rotate past the shredding knives about the axis of rotation.

The above and other features will become apparent from the following description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
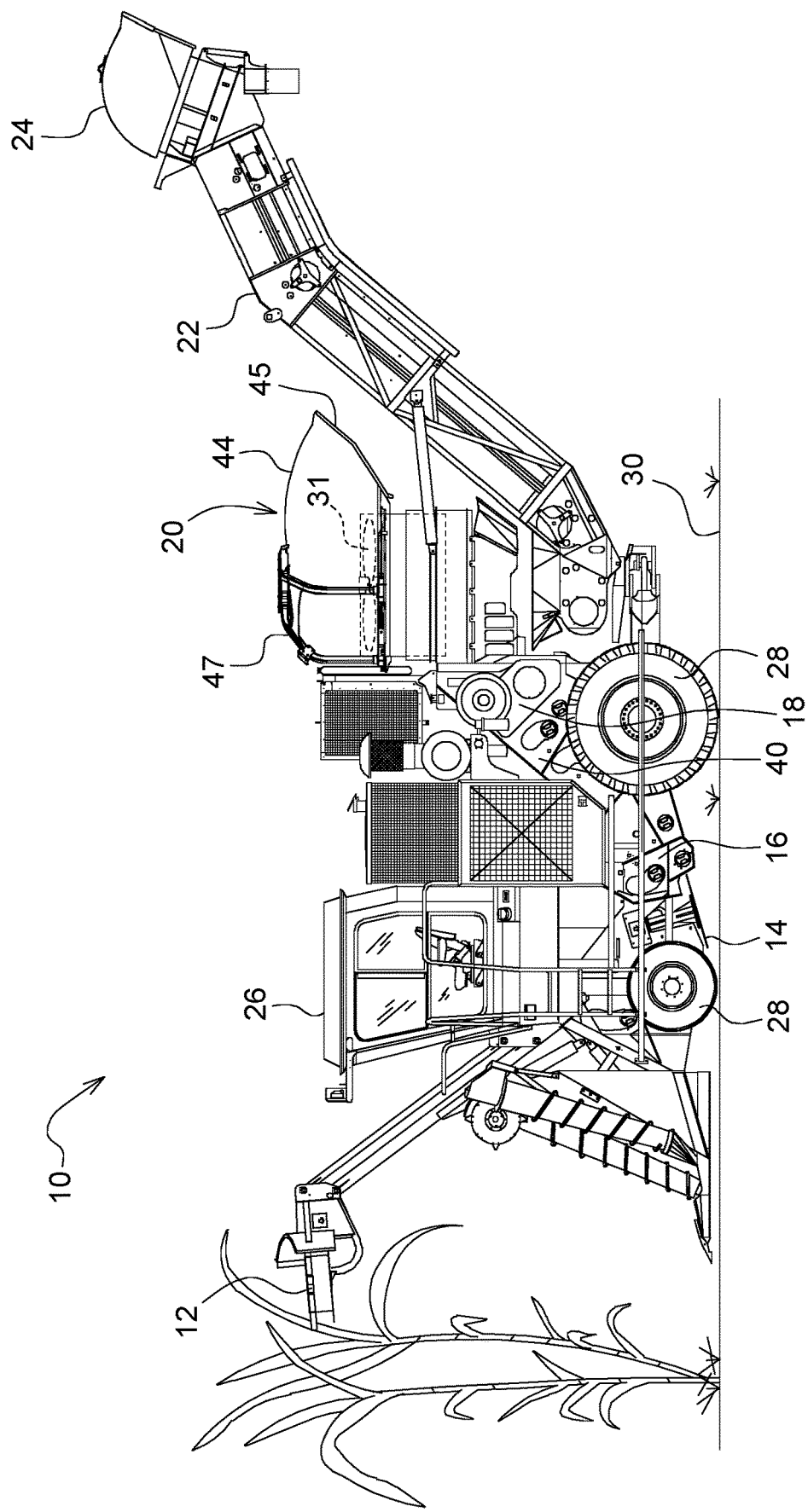
FIG. 1 is a side elevational view showing a sugarcane harvester with a primary extractor.

Referring to FIG. 1, a sugarcane harvester 10 is configured to harvest sugarcane. The harvester 10 includes, for example, a topper 12, one or more basecutters 14 (only one basecutter shown), a feed section 16, a chopper 18, a primary extractor 20, an elevator 22, and a secondary extractor 24. The topper 12 cuts leaf material off the top of the sugarcane plants before the plants are severed by the one or more basecutters 14, but may not remove all the leaf material from the plants before ingestion into the harvester 10. Each of the one or more basecutters 14 includes a left cutting disk and a right cutting disk. The left and right cutting disks of each of the one or more basecutters 14 cooperate with one another to sever the stalks of sugarcane plants at a location near the ground. The feed section 16 receives a mat of severed sugarcane from each of the one or more basecutters 14 and feeds the one or more mats rearwardly. The chopper 18 receives the one or more mats from the feed section 16 and cuts the sugarcane stalks into billets. The primary extractor 20 is positioned between the chopper 18 and the elevator 22. The primary extractor 20 extracts leaf material ingested into the harvester 10 from the billets discharged from the chopper 18 and removes the leaf material from the harvester 10. The elevator 22 is positioned at the rear of the harvester 10 to receive the billets and convey them to an elevated position where the billets are discharged from the harvester 10 into a wagon to be hauled away. The secondary extractor 24 is mounted to the upper discharge end of the elevator 22 to further extract from the billets leaf material that may not have been removed by the primary extractor 20.

The harvester 10 includes an operator's station 26 and traction elements 28. A human operator can operate the harvester 10 from the operator's station 26. The traction elements 28 are positioned on the left and right sides of the harvester 10 for engaging the ground 30 and propelling the harvester 10 along the ground 30. Illustratively, there may be two traction elements 28, each in the form of a ground-engaging wheel, on each side of the harvester 10. In other embodiments, there may be one traction element 28, in the form of a track unit, on each side of the harvester 10

Figure 2:
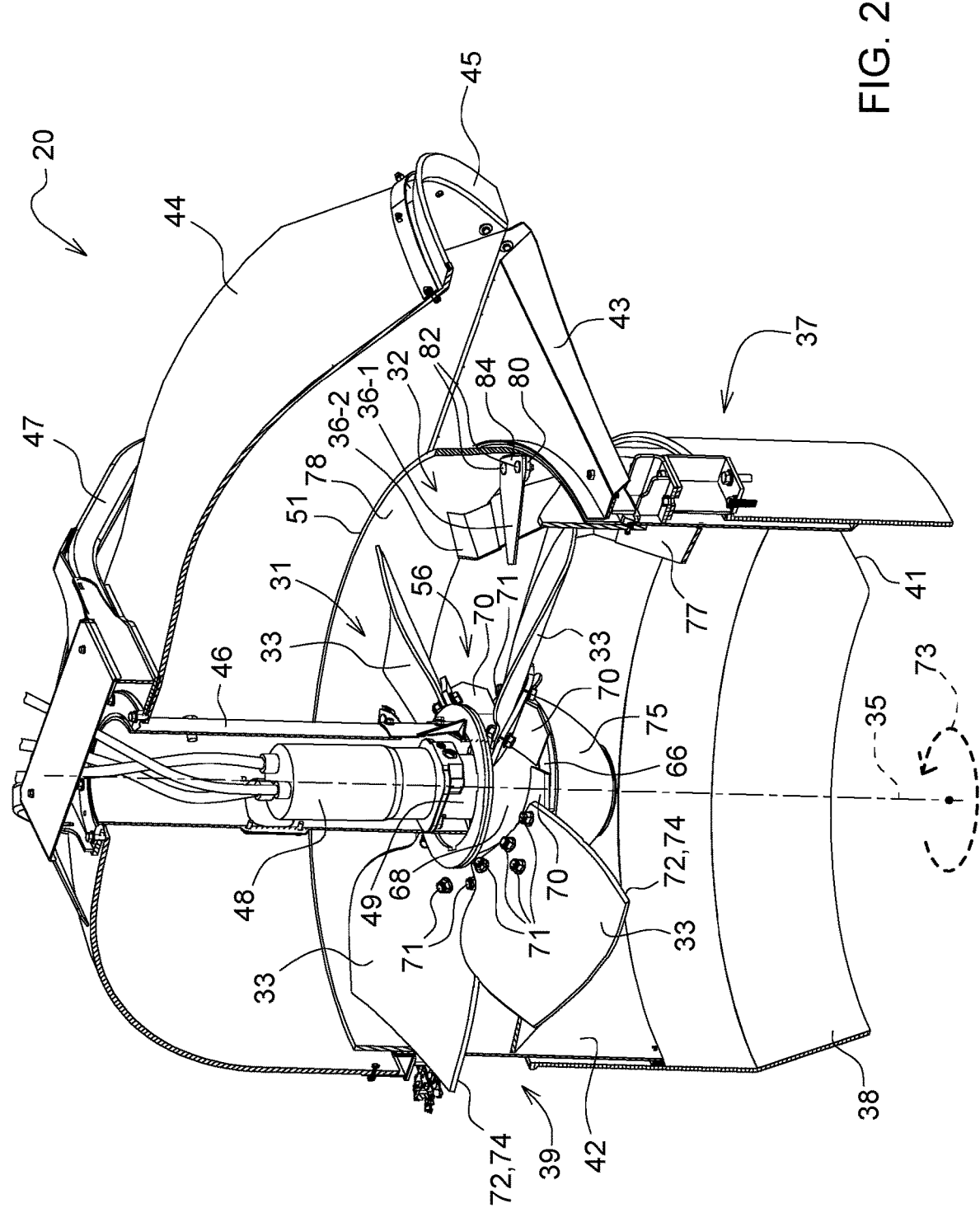
FIG. 2 is a perspective view, with portions broken away, showing the primary extractor with a fan and a leaf shredder with shredding knives fixed about an inner periphery of a housing of the primary extractor.
Figure 3:
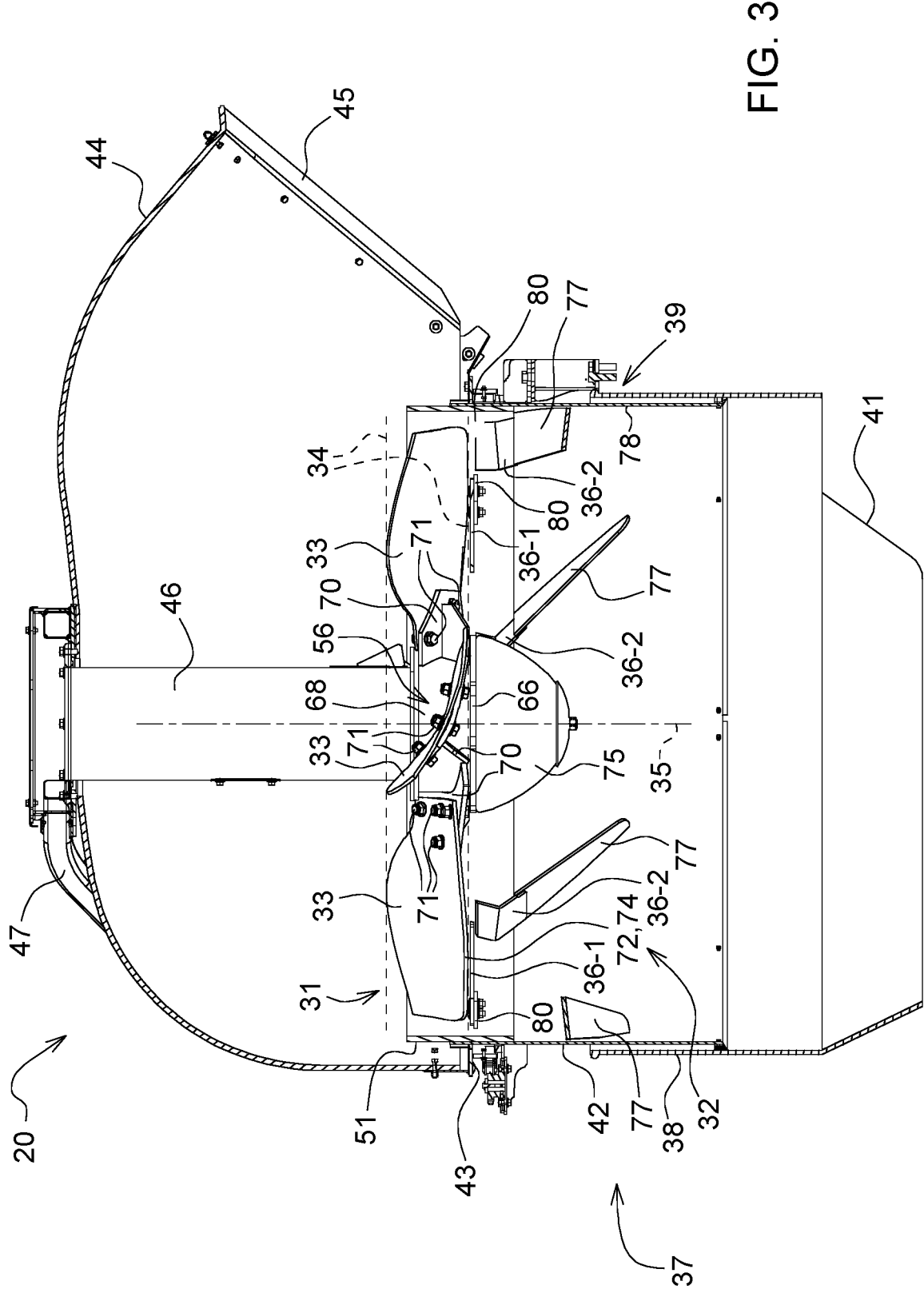
FIG. 3 is a side elevational view, with portions broken away, showing the fan and the leaf shredder.
Figure 4:
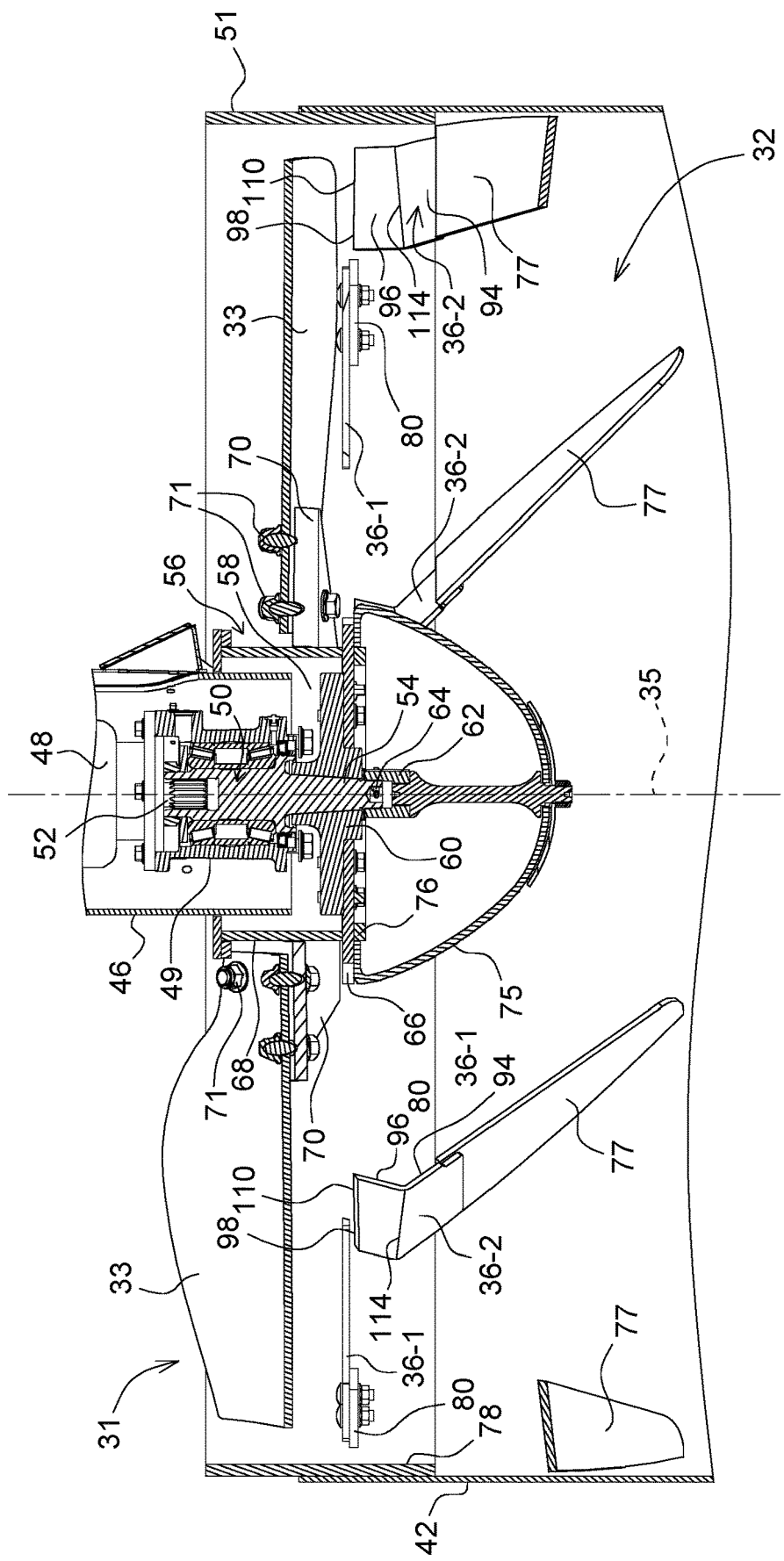
FIG. 4 is a sectional view taken along lines 3-3 of FIG. 2, with portions broken away.
Figure 5:
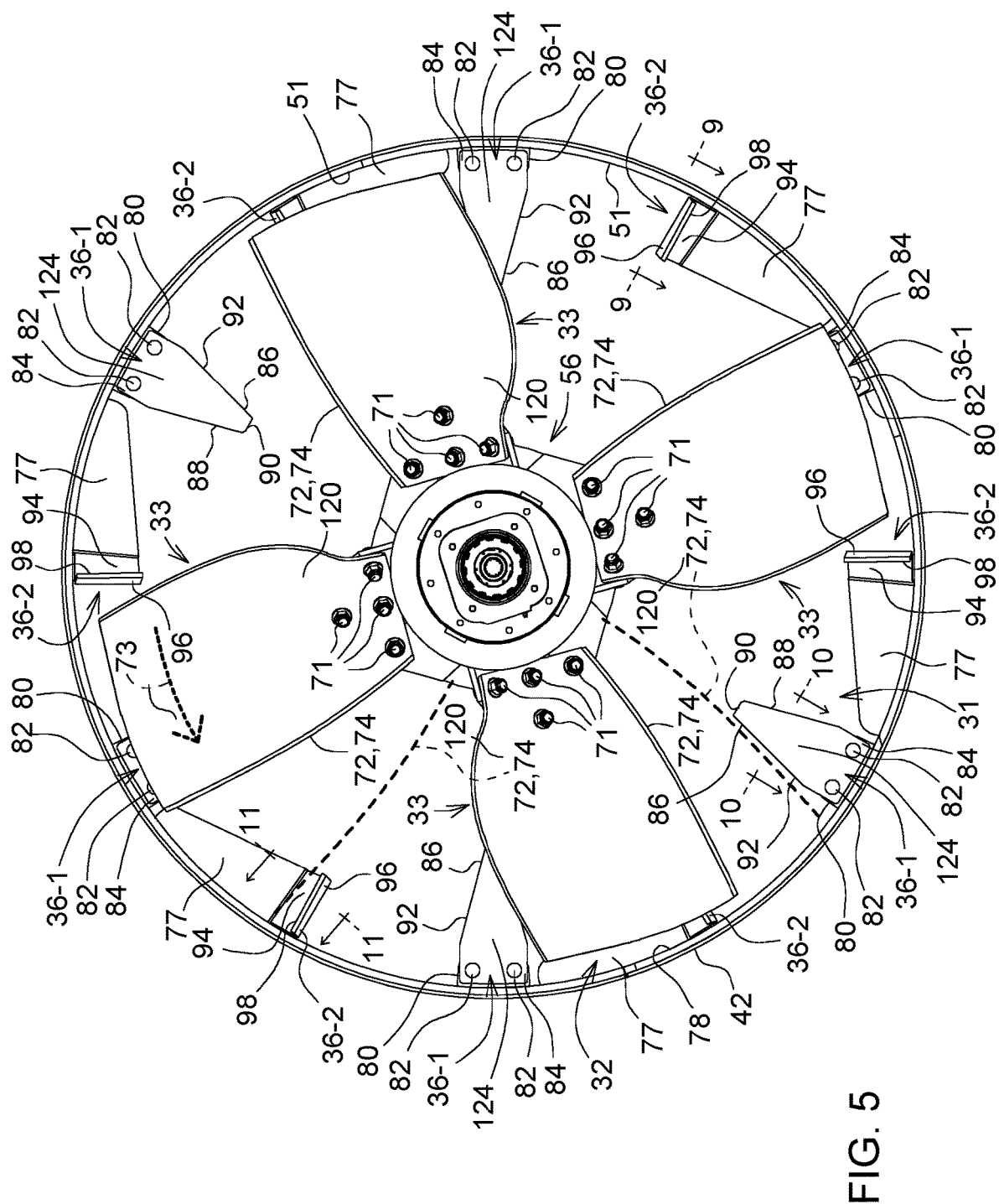
FIG. 5 is a top plan view, with portions broken away, showing the fan and the leaf shredder with its shredding knives including a first set of shredding knives and a second set of shredding knives.
Figure 6:
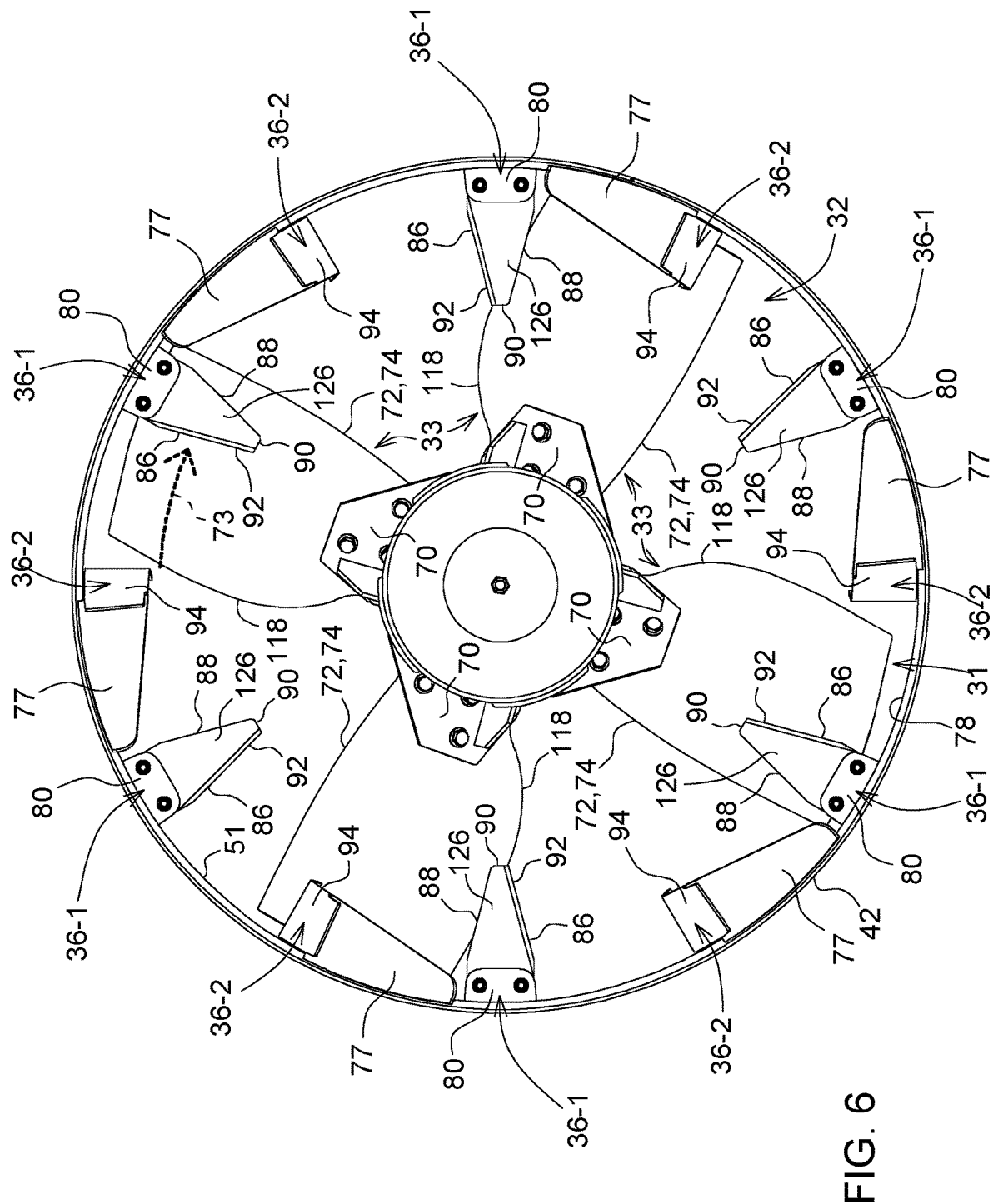
FIG. 6 is a bottom view, with portions broken away, showing the first and second sets of shredding knives.
Figure 7:
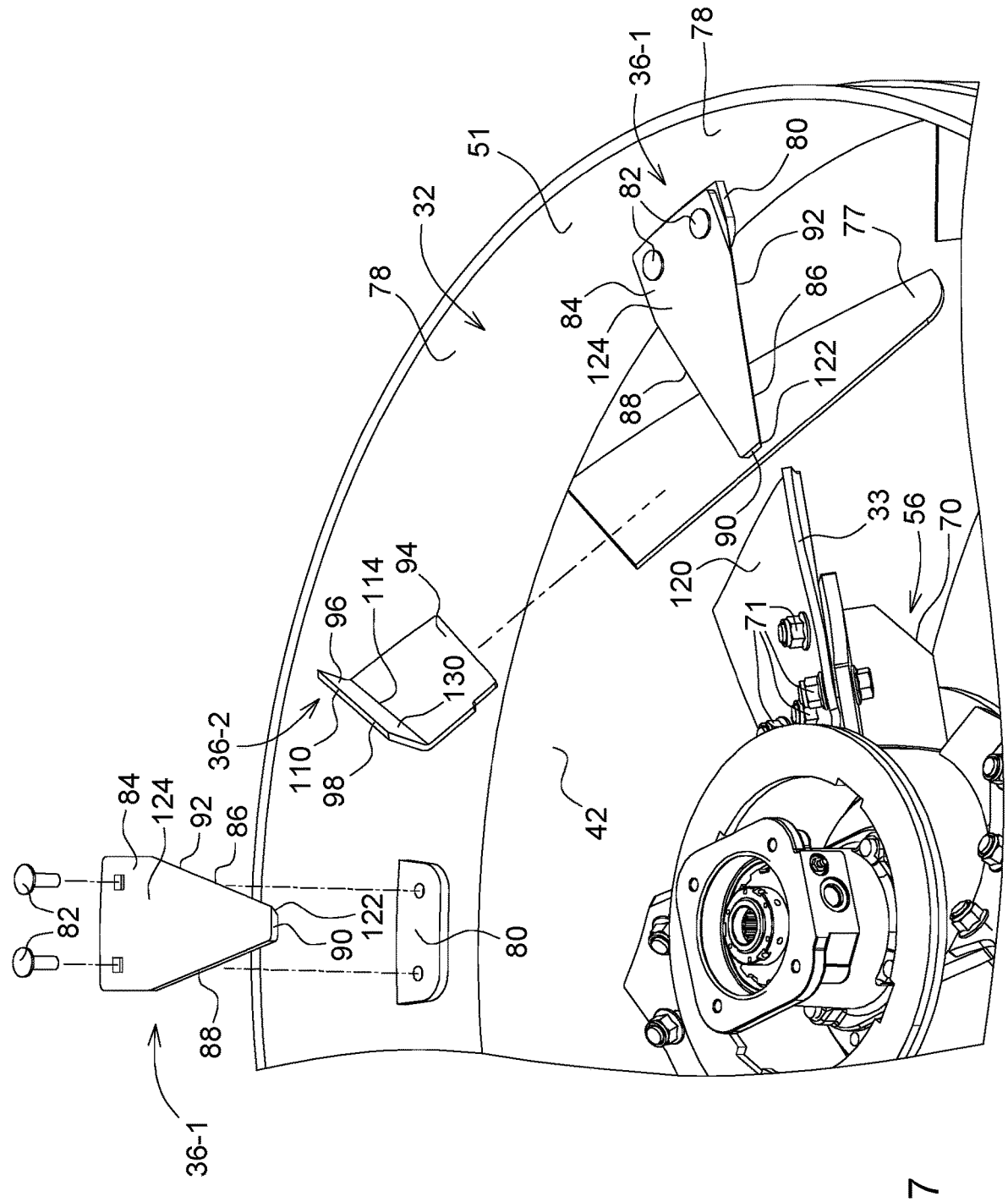
FIG. 7 is an exploded perspective view, with portions broken away, showing a shredding knife of the first set of shredding knives and its respective support ledge and a shredding knife of the second set of shredding knives and its respective vane.
Figure 8:
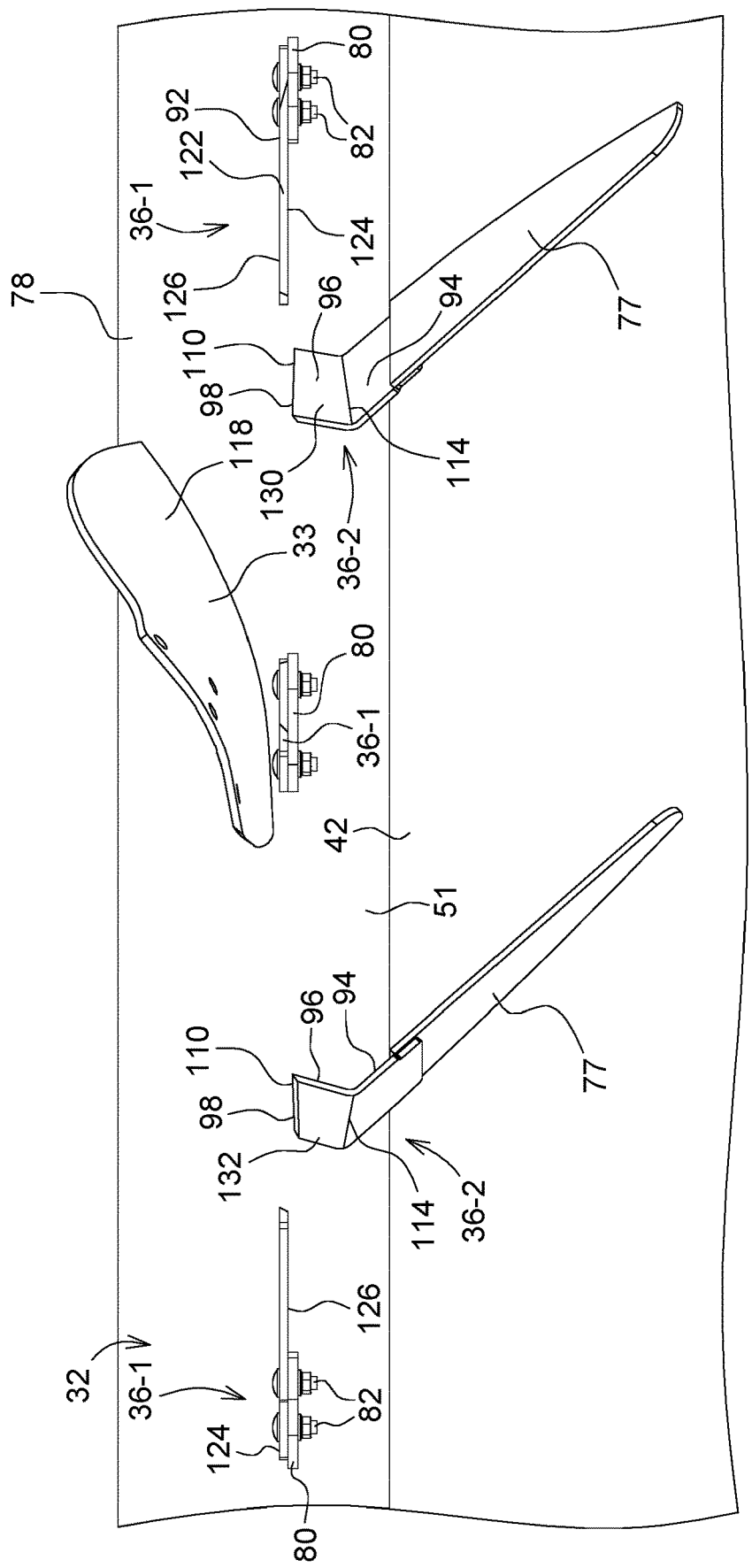
FIG. 8 is an elevational view, looking radially outwardly relative to an axis of rotation of the fan, with portions broken away, showing shredding knives of the first set of shredding knives mounted to respective support ledges and shredding knives of the second set of shredding knives mounted to respective vanes.
Figure 9:
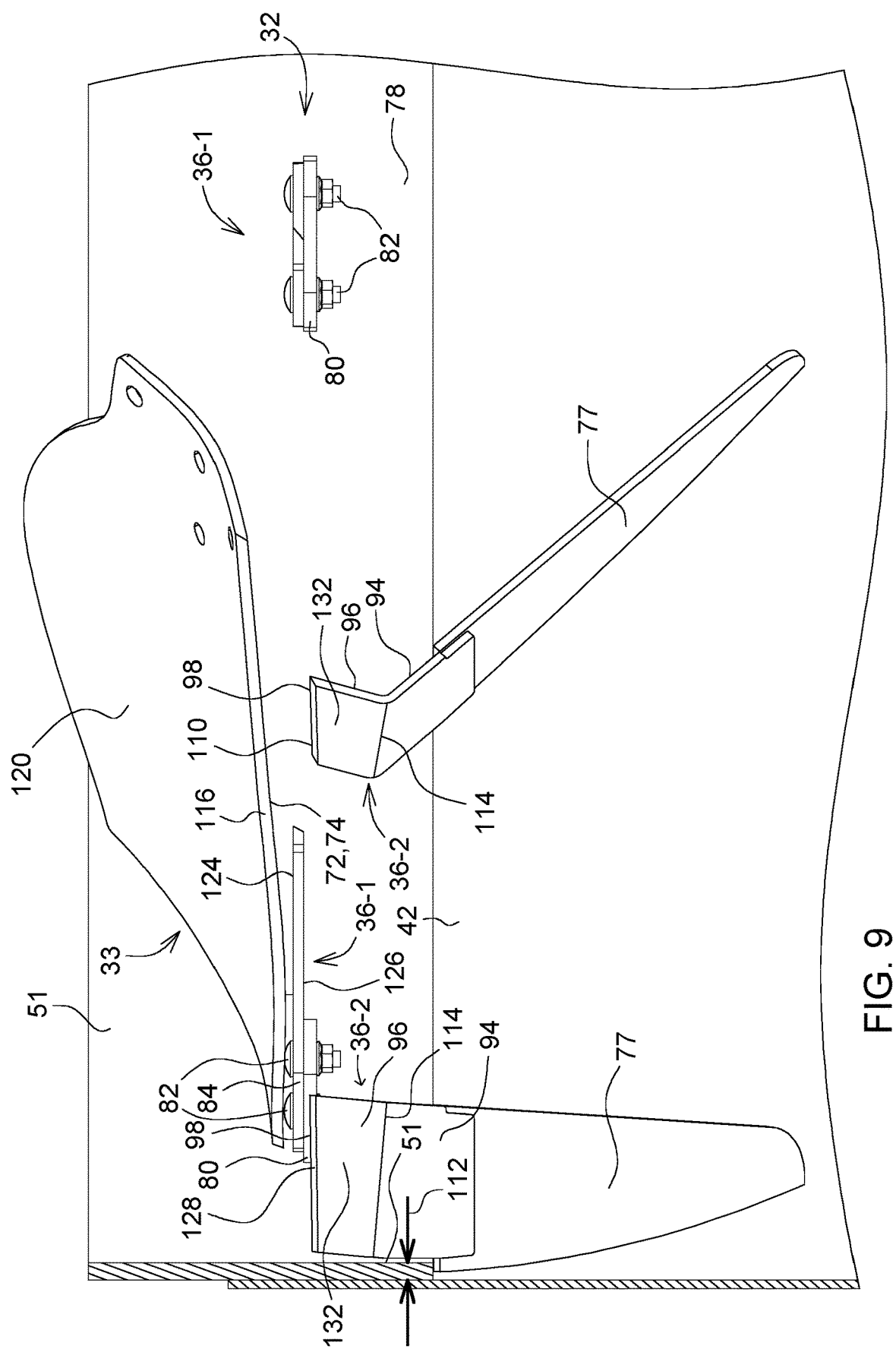
FIG. 9 is a sectional view, taken along lines 9-9 of FIG. 5, with portions broken away.

Referring to FIGS. 2-4, the extractor 20 includes a fan 31 and a leaf shredder 32. The fan 31 includes fan blades 33 (e.g., four fan blades) mounted for rotation in a rotational path 34 about an axis of rotation 35 to induce a flow of air to extract leaf material from billets produced by the chopper 18 of the harvester 10. The billets are discharged from the chopper 18, and are airborne upon discharge from the chopper 18, facilitating separation of leaf material from the billets by the flow of air induced by the fan 31 (billets are discharged from the elevator 22 at the secondary extractor 24, and are airborne when discharged from the elevator 22, facilitating separation of leaf material from the billets by a flow of air induced by the fan of the secondary extractor 24).

The leaf shredder 32 includes shredding knives 36 fixed against rotation about the axis of rotation 35. The shredding knives 36 are offset slightly axially from the fan blades 33 relative to the axis of rotation 35 in proximity to the rotational path 34 of the fan blades 33 such that the fan blades 33 and the shredding knives 36 cooperate to shred leaf material by shearing action as the fan blades 33 rotate past the shredding knives 36 about the axis of rotation 35.

The extractor 20 includes a housing 37. The fan 31 and the leaf shredder 32 are positioned within the housing 37. The fan 31 is supported by the housing 37 for rotation relative thereto about the axis of rotation 35. The shredding knives 36 of the leaf shredder 32 are positioned in fixed relation to the housing 37.

The housing 37 includes a lower portion 38 and an upper portion 39 supported on the lower portion 38. The lower portion 38 is fixed to a frame 40 of the harvester 10 and includes an inlet 41 of the housing 37 through which billets and leaf material enter the extractor 20 from the chopper 18. The upper portion 39 includes a conduit 42, a wear ring 51 nested at least partially in the conduit 42 and mounted to the conduit (e.g., welded), a frame 43 coupled to the conduit 42, and a hood 44 coupled to the frame 43. An extractor rotator can rotate the frame 43 and the hood 44 relative to the conduit 42 to redirect discharge of leaf material from a discharge outlet 45 of the hood 44 for exit of leaf material from the extractor 20 and thus the harvester 10. In some embodiments, the upper portion 39 can be raised and lowered relative to the lower portion 38, with the conduit 42 telescoping up and down relative to the lower portion 38. In other embodiments, the height of the upper portion 39 is fixed relative to the lower portion 38, although the upper portion with its frame 43 and hood 44 supported thereby can rotate relative to the lower portion 38. In such a case, the upper portion 39 may omit the conduit 42, and the wear ring 51 may instead be mounted to the conduit of the lower portion.

The upper portion 39 includes a support column 46. The support column 46 is positioned within the housing 37 and is coupled to and depends from a spider 47 of the frame 43 of the upper portion 39.

The extractor 20 includes a motor 48 and a bearing assembly 49. The motor 48 and the bearing assembly 49 are positioned within and supported by the support column 46. A housing of the bearing assembly 49 is coupled (e.g., bolted) to an end cap of the support column 46. The end cap is coupled (e.g., welded) to a sleeve of the support column 46. The housing of the motor 48 is coupled (e.g., bolted) atop the housing of the bearing assembly 49.

The motor 48 includes an output 50 that rotates about the axis of rotation 35. The output 50 includes a motor shaft 52 and a shaft extension or coupling 54 splined to the motor shaft 52 and extending through the bearing assembly 49 downwardly out of the support column 46.

The shaft extension 54 is rotatably coupled to the bearing assembly 49. A nut is threaded to the shaft extension 54 near the top thereof and tightened against a hardened spacer ring so as to press the hardened spacer ring against the inner race of a double tapered bearing set of the bearing assembly 49. The outer race of the double tapered bearing set is thereby pressed against a shoulder of the housing of the bearing assembly 49.

The extractor 20 includes a hub 56 coupled to the motor 48. The hub 56 is rotatably driven about the axis of rotation 35. The motor 48 is drivingly coupled to the hub 56 via the output 50 to rotate the hub 56 and the fan 31 coupled thereto about the axis of rotation 35. The hub 56 receives and is coupled to the output 50 for rotation of the hub 56 therewith about the axis of rotation 35. The fan blades 33 are coupled to the hub 56 for rotation together with the hub 56 about the axis of rotation 35.

The hub 56 may be constructed and coupled to the shaft extension 54 in a wide variety of ways. Illustratively, the hub 56 includes a central support 58. The central support 58 receives and is coupled to the shaft extension 54 of the output 50 for rotation of the central support 58 therewith about the axis of rotation 35. A sleeve 60 of the central support 58 includes a tapered hole that receives and mates with a tapered portion of the shaft extension 54. The sleeve 60 and the shaft extension 54 are keyed to one another against rotation therebetween. A nut 62 is threaded onto the tapered portion of the shaft extension 54 with a cotter pin 64 passing through corresponding holes formed in the nut 62 and an end portion of the shaft extension 54, fixing the central support 58 of the hub 56 to the shaft extension 54 for rotation therewith about the axis of rotation 35. A support plate 66 of the hub 56 is fastened (e.g., with eight bolts) to an annular flange of the central support 58. A sleeve 68 is coupled to the support plate 66 (e.g., welded) so as to extend upwardly therefrom and surround the support column 46.

The fan 31 is coupled to the hub 56 to rotate therewith about the axis of rotation 35. The fan blades 33 are coupled to the sleeve 68 thereabout via a set of attachment points 70 of the hub 56. The fan blades 33 are coupled respectively to the attachment points 70 with fasteners 71 (e.g., bolts). For example, each fan blade 33 is coupled to the respective attachment point 70 with four fasteners 71.

Each of the attachment points 70 includes a mounting plate fixedly coupled to the sleeve 68 (e.g., welded) and a reinforcement plate fixedly coupled to the sleeve 68 (e.g., welded) and to an underside of the mounting plate of the attachment point 70 (e.g., welded) to reinforce the mounting plate of the attachment point 70. Each fan blade 33 is coupled to a mounting plate of the respective attachment point 70 with the fasteners 71. The fan blades 33 may be coupled to the hub 56 in a wide variety of ways.

The fan blades 33 are mounted to the hub 56 to rotate therewith about the axis of rotation 35. Such rotation of the fan blades 33 induces the flow of air through the extractor 20. Each of the fan blades 33 includes a leading edge 72 relative to a direction of rotation 73 of the fan 31 and its fan blades 33 about the axis of rotation 35. The leading edge 72 includes a cutting edge 74 to cut leaf material. Illustratively, the cutting edge 74 extends the full length of the leading edge 72 to promote the cutting effectiveness of the fan blade 33. In other embodiments, the cutting edge 74 may extend less than the full length of the leading edge 72.

The extractor 20 includes a cover 75 coupled to the hub 56. The cover 75 includes a dome located on the support plate 66 via a positioning ring 76 fixed to the support plate (e.g., welded) and a cap fastened to a bottom portion of the dome. A rod of the cover 75 is threaded at one end into the nut 62, and a nut of the cover 75 is threaded onto an opposite end of the post to secure the cap against the dome.

Referring to FIGS. 4-9, the housing 37 includes vanes 77. The vanes 77 are positioned just upstream of the fan 31 and spaced evenly about the axis of rotation 35 to help guide air and leaf material entrained therein toward the fan blades 33. The vanes 77 are coupled to an inner periphery 78 of the housing 37 in fixed relation thereto. The vanes 77 are mounted (e.g., welded) to the conduit 42, although the vanes 77 may be coupled to the inner periphery 78 in any suitable manner. The wear ring 51 is positioned above the vanes 77. The vanes 77 may be positioned just below the wear ring 51, with the vanes 77 positioned on top of the vanes 77.

The leaf shredder 32 is coupled to the housing 37. The shredding knives 36 of the leaf shredder 32 are supported by the inner periphery 78 of the housing 37 so as to be mounted in fixed relation thereto. The shredding knives 36 are positioned below the rotational path 34 of the fan blades 33 to cooperate therewith to shred leaf material by shearing action as the fan blades 33 rotate past the shredding knives 36 about the axis of rotation 35.

The shredding knives 36 include a first set of shredding knives 36-1 and a second set of shredding knives 36-2. The first set of shredding knives 36-1 is mounted to the wear ring 51, and the second set of shredding knives 36-2 is mounted to the vanes 77. The shredding knives 36-1 are positioned in alternating relation with the shredding knives 36-2 about the axis of rotation 35. In other embodiments, the shredding knives 36-1 and 36-2 may be arranged in non-alternating relation with one another. It is to be understood that, in some embodiments, the leaf shredder 32 may include the first set of shredding knives 36-1 but not the second set of shredding knives 36-2, and, in other embodiments, the leaf shredder 32 may include the second set of shredding knives 36-2 but not the first set of shredding knives 36-1.

Regarding the first set of shredding knives 36-1, the shredding knives 36-1 are spaced evenly about the axis of rotation 35. Illustratively, the shredding knives 36-1 are positioned respectively between the shredding knives 36-2. Each shredding knife 36-1 is centered angularly between a respective pair of angularly adjacent shredding knives 36-2 relative to the axis of rotation 35, to maximize the open space between angularly adjacent shredding knives 36-1, 36-2 so as not to limit air or material flow that might otherwise provide an area where material collects.

The shredding knives 36-1 are mounted to the wear ring 51. Illustratively, the shredding knives 36-1 are mounted respectively to and project radially inwardly respectively from support ledges 80 relative to the axis of rotation 35. Each support ledge 80 is mounted to the wear ring 51 in fixed relation thereto (e.g., welded). Each shredding knife 36-1 may be fastened to the support ledge 80 with fasteners 82 (e.g., two bolts). In other embodiments, the shredding knife 36-1 may be welded or otherwise mounted to the support ledge 80 or directly to the wear ring 51.

Each shredding knife 36-1 may be triangle-shaped. In such a case, the shredding knife 36-1 includes a base 84, a upstream side 86, and a downstream side 88 ("upstream" and "downstream" here in relation to the direction of rotation 73 of the fan 31 and its fan blades 33). In the illustrated embodiment, the base 84 is mounted to the support ledge 80 with the fasteners 82. The sides 86, 86 extend radially from the base 84 to a radially innermost tip 90 of the shredding knife 36-1 relative to the axis of rotation 35. The shredding knife 36-1 is configured, for example, as a horizontal plate.

The shredding knife 36-1 includes a cutting edge 92 to cut leaf material. The cutting edge 92 is positioned in proximity to the rotational path 34 of the fan blades 33 to cooperate with the cutting edges 74 of the fan blades 33 to shred leaf material by shearing action as the fan blades 33 rotate past the shredding knife 36-1 about the axis of rotation 35. The upstream side 86 includes the cutting edge 92, which extends radially between the base 84 and the tip 90 relative to the axis of rotation 35.

In some embodiments, the shredding knife 36-1 may be reversible to extend the useful life of the shredding knife 36-1. In such a case, the downstream side 88 of the shredding knife 36-1 may have a similar cutting edge as the upstream side 86 but inverted, such that, when the shredding knife 36-1 is flipped over, the bevel of the cutting edge also faces downwardly. To reverse the shredding knife 36-1, the fasteners 82 are removed from the support ledge 80, the shredding knife 36-1 is flipped over, and the fasteners 82 are reinstalled to mount the shredding knife 36-1 to the support ledge 80 in reverse orientation.

Regardless whether the shredding knife 36-1 is reversible, the shredding knife 36-1 can be replaced readily. To do so, the fasteners 82 are removed, a fresh knife 36-1 is installed on the support ledge 80, and the fasteners 82 are reinstalled to mount the shredding knife 36-1 to the support ledge 80.

Turning to the second set of shredding knives 36-2, the shredding knives 36-2 are mounted respectively to the vanes 77. The shredding knives 36-2 are spaced evenly about the axis of rotation 35.

Each of the shredding knives 36-2 includes an anchor portion 94 and a presenting portion 96. The anchor portion 94 is mounted to the vane 77. In the illustrated embodiment, the anchor portion 94 is mounted to the vane 77 in fixed relation thereto by welding, with an upper surface of the anchor portion 94 mounted to a lower surface of the vane 77. In other embodiments, the anchor portion 94 may be mounted to the vane 77 with one or more fasteners (e.g., bolt(s)) or other suitable mounting mechanisms, in which case the shredding knife 36-2 may be replaceable.

The presenting portion 96 includes a cutting edge 98 to cut leaf material. The presenting portion 96 is angled upwardly from the anchor potion 94 to present the cutting edge 98 in proximity to the rotational path 34 of the fan blades 33 to cooperate with the cutting edges 74 of the fan blades 33 to shred leaf material by shearing action as the fan blades 33 rotate past the shredding knife 36-2 about the axis of rotation 35. The cutting edge 98 is positioned at the top 110 of the shredding knife 36-2.

The shredding knife 36-2 extends upwardly from the vane 77 and alongside a radially inner surface of the wear ring 51. The shredding knife 36-2, or at least a portion thereof, is spaced radially inward of the conduit 42 by at least a thickness 112 of the wear ring 51 such that the shredding knife 36-2 extends upwardly from the vane 77 to a position radially inward of the wear ring 51 relative to the axis of rotation 35.

The shredding knife 36-2 is configured, for example, as a bent plate with a bend 114 between the anchor portion 94 and the presenting portion 96. The bent plate projects axially away from the vane 77 toward the rotational path 34 relative to the axis of rotation 35 to present the cutting edge 98 at the top 110 of the bent plate in proximity to the rotational path 34.

Figure 10:
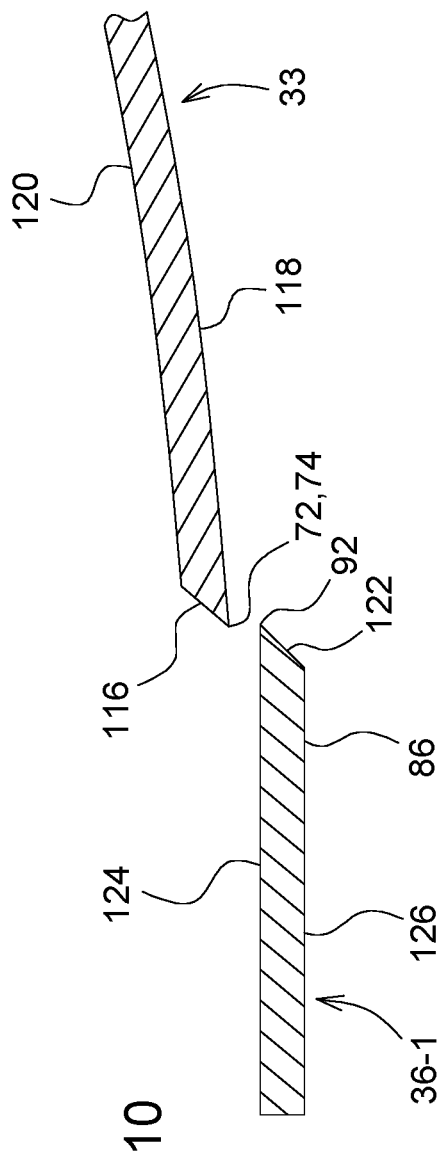
FIG. 10 is a sectional view, taken along lines 10-10 of FIG. 5, with portions broken away, showing a fan blade approaching a shredding knife of the first set of shredding knives for shearing action therebetween.
Figure 11:
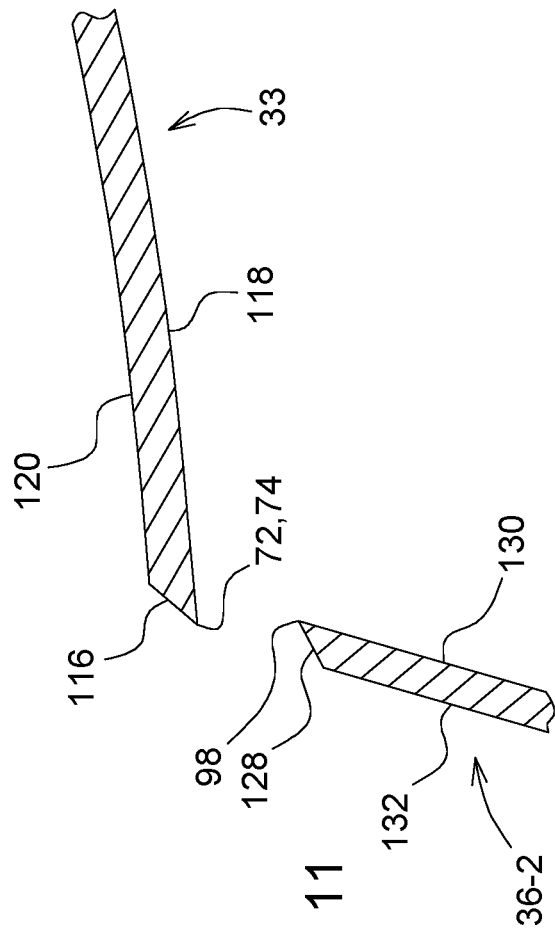
FIG. 11 is a sectional view, taken along lines 11-11 of FIG. 5, with portions broken away, showing a fan blade approaching a shredding knife of the second set of shredding knives for shearing action therebetween.

Referring to FIGS. 10 and 11, each fan blade 33 and shredding knife 36-1, 36-2 includes a cutting edge. The cutting edge 74 of each fan blade 33 includes a bevel 116 facing upwardly. The bevel 116 and a lower surface 118 of the fan blade 33 cooperate to provide the cutting edge 74, with the bevel 116 extending between and interconnecting the lower surface 118 and an upper surface 120 of the fan blade 33.

The cutting edge 92 of each shredding knife 36-1 includes a bevel 122 facing downwardly. The bevel 122 and an upper surface 124 of the shredding knife 36-1 cooperate to provide the cutting edge 92, with the bevel 122 extending between and interconnecting the upper surface 124 and a lower surface 126 of the shredding knife 36-1.

The cutting edge 98 of each shredding knife 36-2 includes a bevel 128 facing in the direction of rotation 73 of the fan blades 33. The bevel 128 and an upstream surface 130 of the shredding knife 36-2 cooperate to provide the cutting edge 98, with the bevel 128 extending between and interconnecting the upstream surface 130 and a downstream surface 132 of the shredding knife 36-2 ("upstream" and "downstream" here in relation to the direction of rotation 73 of the fan 31 and its fan blades 33).

The fan blades 33 and the shredding knives 36-1, 36-2 cooperate to shred leaf material. The fan blades 33 cooperate with the first set of shredding knives 36-1 to shred leaf material by shearing action as the fan blades 33 rotate past the shredding knives 36-1 about the axis of rotation 35, and cooperate with the second set of shredding knives 36-2 to shred leaf material by shearing action as the fan blades 33 rotate past the shredding knives 36-2 about the axis of rotation 35.

It is to be understood that the fan 31 may include any suitable number of fan blades 33, and the leaf shredder 32 may include any suitable number of shredding knives 36. The shredding knives 36 may be arranged in any suitable angular arrangement about the axis of rotation 35.

Threads and welds are not shown for ease of illustration. However, it is to be appreciated that bolts, nuts, and corresponding mating surfaces would have threads.

While the above describes example embodiments of the present disclosure, these descriptions should not be viewed in a limiting sense. Rather, other variations and modifications can be made without departing from the scope and spirit of the present disclosure as defined in the appended claims.

What is claimed is:

1. An extractor for a sugarcane harvester that chops stalks of sugarcane into billets, the extractor comprising:
   a housing,
   a fan positioned within the housing and comprising fan blades mounted for rotation in a rotational path about an axis of rotation to induce a flow of air to extract leaf material from billets produced by the sugarcane harvester, and
   a leaf shredder positioned within the housing and comprising shredding knives fixed against rotation about the axis of rotation, the shredding knives offset axially from the fan blades relative to the axis of rotation in proximity to the rotational path of the fan blades such that the fan blades and the shredding knives cooperate to shred leaf material by shearing action as the fan blades rotate past the shredding knives about the axis of rotation;
   wherein the housing comprises vanes, and the shredding knives are mounted respectively to the vanes.

2. The extractor of claim 1, wherein the shredding knives are positioned in fixed relation to the housing.

3. The extractor of claim 2, wherein the shredding knives are supported by an inner periphery of the housing.

4. The extractor of claim 1, wherein the housing comprises a wear ring, and the shredding knives are mounted to the wear ring.

5. The extractor of claim 4, wherein the housing comprises support ledges mounted to the wear ring, and the shredding knives are mounted respectively to and project radially inwardly respectively from the support ledges relative to the axis of rotation.

6. The extractor of claim 5, wherein each shredding knife is triangle-shaped so as to include a base mounted to the respective support ledge and a side comprising a cutting edge extending radially between the base and a radially innermost tip of the shredding knife relative to the axis of rotation.

7. The extractor of claim 4, wherein a leading edge of each of the fan blades comprises a cutting edge with a bevel facing upwardly, and each of the shredding knives comprises a cutting edge with a bevel facing downwardly.

8. The extractor of claim 1, wherein each of the shredding knives comprises an anchor portion mounted to the respective vane and a presenting portion comprising a cutting edge and angled from the anchor portion to present the cutting edge in proximity to the rotational path of the fan blades.

9. The extractor of claim 1, wherein the housing comprises a conduit and a wear ring nested at least partially within the conduit, the vanes are mounted to the conduit, the wear ring is positioned above the vanes, and at least a portion of each of the shredding knives is spaced radially inward of the conduit by at least a thickness of the wear ring such that each shredding knife extends upwardly from the respective vane to a position radially inward of the wear ring relative to the axis of rotation.

10. The extractor of claim 1, wherein a leading edge of each of the fan blades comprises a cutting edge with a bevel facing upwardly, and each of the shredding knives comprises a cutting edge with a bevel facing in a direction of rotation of the fan blades.

11. The extractor of claim 1, wherein the housing comprises a wear ring, and the shredding knives comprise a first set of shredding knives mounted to the wear ring and a second set of shredding knives mounted to the vanes.

12. The extractor of claim 11, wherein the shredding knives of the first set of shredding knives are positioned in alternating relation with the shredding knives of the second set of shredding knives about the axis of rotation.

13. The extractor of claim 12, wherein each shredding knife of the first set of shredding knives is centered angularly between a respective pair of angularly adjacent shredding knives of the second set of shredding knives relative to the axis of rotation.

14. The extractor of claim 11, wherein each of the shredding knives of the first set of shredding knives comprises a horizontal plate projecting radially inwardly away from the wear ring relative to the axis of rotation and comprising a cutting edge on an upstream side of the horizontal plate relative to a direction of rotation of the fan blades, and each of the shredding knives of the second set of shredding knives comprises a bent plate projecting axially away from the respective vane toward the rotational path relative to the axis of rotation to present a cutting edge included in the bent plate at a top thereof in proximity to the rotational path.

15. The extractor of claim 11, wherein a leading edge of each of the fan blades comprises a cutting edge with a bevel facing upwardly, each of the shredding knives of the first set of shredding knives comprises a cutting edge with a bevel facing downwardly, and each of the shredding knives of the second set of shredding knives comprises a cutting edge with a bevel facing in a direction of rotation of the fan blades.

16. The extractor of claim 1, wherein each of the fan blades and each of the shredding knives comprises a cutting edge.

17. The extractor of claim 1, wherein the shredding knives are positioned below the rotational path of the fan blades.

18. A sugarcane harvester comprising the extractor of claim 1.

* * * * *